US008751122B2

(12) United States Patent
Arnold et al.

(10) Patent No.: US 8,751,122 B2
(45) Date of Patent: Jun. 10, 2014

(54) METHOD FOR CHECKING AN EMERGENCY CONDITION IN A TRANSMISSION SYSTEM

(71) Applicant: ZF Friedrichshafen AG, Friedrichshafen (DE)

(72) Inventors: Jorg Arnold, Immenstaad (DE); Michael Sohler, Isny (DE); Klaus Steinhauser, Kressbronn (DE); Thilo Schmidt, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 16 days.

(21) Appl. No.: 13/748,689

(22) Filed: Jan. 24, 2013

(65) Prior Publication Data
US 2013/0196818 A1      Aug. 1, 2013

(30) Foreign Application Priority Data

Jan. 26, 2012   (DE) .......................... 10 2012 201 145

(51) Int. Cl.
*F16H 61/12*         (2010.01)
(52) U.S. Cl.
CPC ..................................... *F16H 61/12* (2013.01)
USPC .......................................................... 701/62
(58) Field of Classification Search
CPC ................ F16H 2061/1208; F16H 2061/1204; F16H 61/12; F16H 61/686
USPC .......................................................... 701/62
See application file for complete search history.

(56) References Cited

U.S. PATENT DOCUMENTS

| | | | | |
|---|---|---|---|---|
| 4,667,541 | A | * | 5/1987 | Shimaoka et al. .............. 477/61 |
| 4,779,490 | A | * | 10/1988 | Milunas et al. ............... 477/115 |
| 4,896,569 | A | * | 1/1990 | Ito et al. ........................... 477/65 |
| 5,855,532 | A | * | 1/1999 | Sugiyama ........................ 477/97 |
| 5,947,867 | A | | 9/1999 | Gierer et al. |
| 5,991,679 | A | | 11/1999 | Sigg |
| 6,081,760 | A | | 6/2000 | Dreibholz et al. |
| 8,401,747 | B2 | * | 3/2013 | Ito .................................. 701/51 |
| 8,543,284 | B2 | * | 9/2013 | Thor ........................... 701/29.7 |
| 2014/0074362 | A1 | * | 3/2014 | Arnold et al. ................... 701/54 |

FOREIGN PATENT DOCUMENTS

| | | |
|---|---|---|
| DE | 196 01 618 A1 | 7/1997 |
| DE | 10 2009 000 248 A1 | 7/2010 |
| EP | 0 840 864 B1 | 1/2000 |
| EP | 0 852 679 B1 | 3/2000 |

OTHER PUBLICATIONS

German Search Report Corresponding to DE 10 2012 201 145.5.

* cited by examiner

*Primary Examiner* — Dirk Wright
(74) *Attorney, Agent, or Firm* — Davis & Bujold, PLLC; Michael J. Bujold

(57) ABSTRACT

A method of monitoring an emergency condition in an automatic transmission, with which, by comparing a theoretical with an actual rotational speed, measured on the transmission input side, overlap of the activated emergency condition, with a gear engagement process called for during the normal condition, is prevented.

12 Claims, 2 Drawing Sheets

METHOD FOR CHECKING AN EMERGENCY CONDITION IN A TRANSMISSION SYSTEM

This application claims priority from German patent application serial. no. 10 2012 201 145.5 filed Jan. 26, 2012.

FIELD OF THE INVENTION

The present invention concerns a method for checking an emergency condition in an automatic transmission.

BACKGROUND OF THE INVENTION

In automatic transmissions it is known that in the context of an emergency function, shifting elements are acted upon hydraulically by means of valves, in order to engage in the automatic transmission a fail-safe gear by means of which the vehicle can be operated safely, for example until the fault in the automatic transmission has been eliminated. It has been shown that before a gearshift or gear engagement called for by the driver, i.e. before a condition change of the shifting elements involved for engaging the gear from a non frictionally locked to a frictionally locked state, it is important to know whether any functional fault is present in the system, for example caused by sticking of the valve responsible for obtaining the fail-safe gear. If there is an unrecognized functional fault that relates to the hydraulic fail-safe gear, then the engagement of further shifting elements can result in undesired redundancy of a gearset or in blocking of the automatic transmission.

SUMMARY OF THE INVENTION

The purpose of the present invention is to propose a method for checking an emergency condition, of the type described at the start, with which redundancy in the automatic transmission can be prevented reliably, inexpensively and in a simple manner.

Accordingly a method is indicated, whereby an emergency function or emergency condition in the automatic transmission is monitored, such that for this, by evaluating a stored theoretical transmission input rotational speed and a measured, actual rotational speed, an overlap of an already activated emergency condition and of the normal condition is recognized and prevented.

With the method proposed according to the invention a functional monitoring approach involving a theoretical—actual comparison is indicated, which ensures that gear engagement is only carried out if it has been ascertained that, for example, the fail-safe gear has not already been hydraulically preselected. In this way, with the proposed method gearset redundancy is reliably prevented without incurring additional costs for an otherwise necessary pressure sensor on the valve provided in the hydraulic system for initiating the emergency function.

To monitor the emergency condition in relation to erroneous activation, in accordance with an advantageous embodiment of the invention, for the purposes of the theoretical—actual comparison a change of the actual curve, for example, of the turbine rotational speed of the torque converter provided at the transmission input can be recognized, since that speed is already detected in the transmission control system and can therefore be evaluated in the simplest manner in the context of the proposed method.

If it is recognized that the shifting elements or clutches used for obtaining the fail-safe gear have already been activated and in addition further shifting elements have to be activated for engaging another gear, then by means of the method according to the invention the emergency function is permanently activated so that the engagement of further shifting elements is prevented by switching off the pressure regulator. For this, in the event of a recognized fault the transmission electronics or transmission control system can be switched off in order to be able to move the vehicle safely in the fail-safe gear until the fault has been eliminated.

BRIEF DESCRIPTION OF THE DRAWINGS

Below, the present invention is explained further with reference to the drawings, which show.

DETAILED DESCRIPTION OF THE PREFERRED EMBODIMENTS

Figures 1, 2:
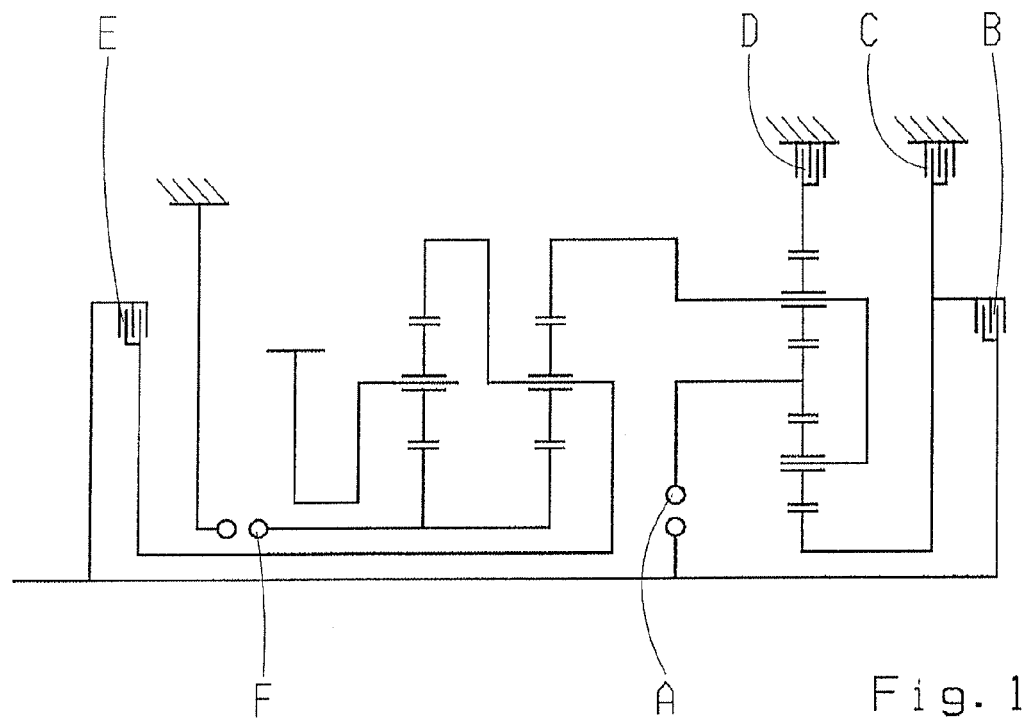
FIG. 1: A schematic representation of a gearset layout in an automatic transmission.
FIG. 2: A shifting scheme for the automatic transmission according to FIG. 2.

FIG. 1 shows a transmission layout of gearsets of an automatic transmission in which, for example, the method according to the invention for monitoring an emergency condition can be carried out, although the use of the proposed method is not restricted to this gearset layout. The automatic transmission shown as an example is of planetary design. for example with three planetary gearsets and six shifting elements A, B, C, D, E, F. The shifting element A is for example an interlocking clutch, the shifting element B is a friction clutch, the shifting element C is a friction brake, the shifting element D is a friction brake, the shifting element E is a friction clutch and the shifting element F is an interlocking clutch.

FIG. 2 shows as an example a shifting scheme for the gearset layout represented in FIG. 1. The shifting scheme shows which of the shifting elements A to F have to be hydraulically activated or shifted in order to obtain the gears D1 to D9. For example, to engage the gear D1, the shifting elements A, D and F are hydraulically closed.

Figure 3:
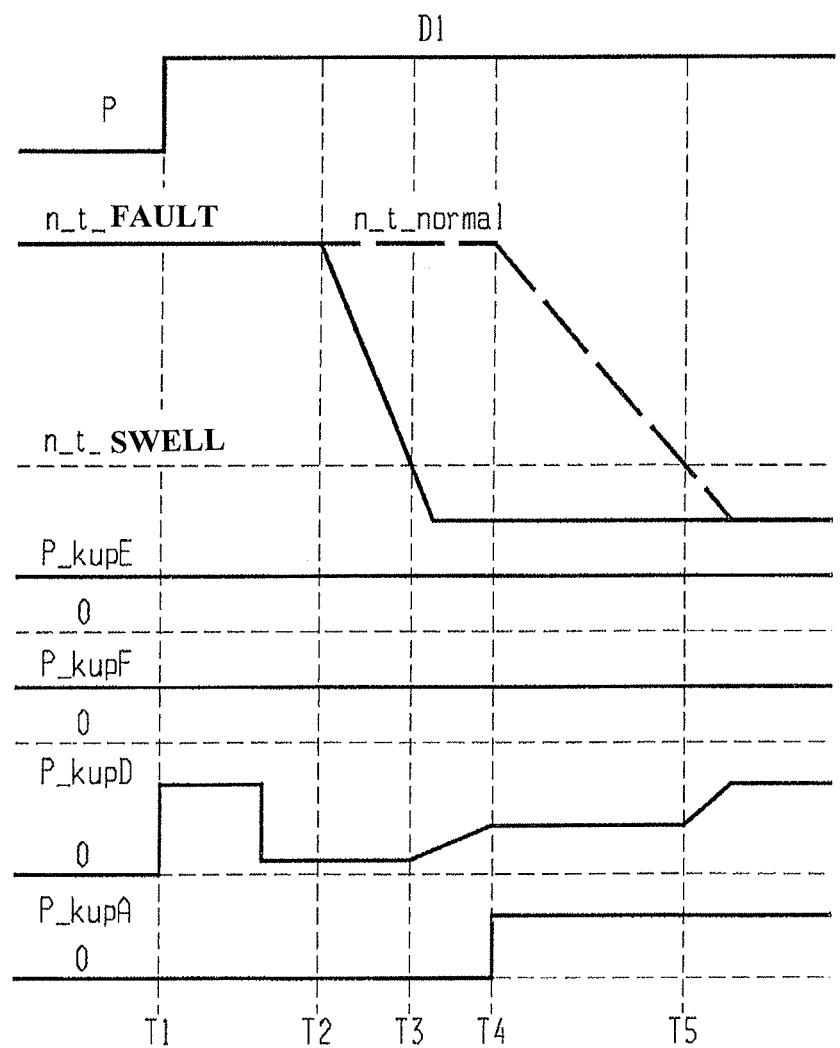
FIG. 3: A diagram showing a number of curves of different transmission parameters during a monitoring process according to the invention, of an emergency condition in the automatic transmission.

FIG. 3 shows a number of curves of transmission parameters as functions of time, which occur in the automatic transmission during a shifting process from a parked position to a gear D1 desired by the driver, the figure showing on the one hand a theoretical curve of the turbine rotational speed n_t_normal for the normal condition without closed shifting elements E and F and on the other hand a faulty actual curve of the turbine rotational speed n_t_Fault for the fault condition in which the shifting elements E and F are closed in order to engage the fail-safe gear. The theoretical turbine speed curve n_t_normal is represented by a broken line whereas the erroneous actual curve of the turbine speed n_t_Fault is shown as a continuous line.

The driver's wish is initiated in the automatic transmission by moving the selector lever at time T1 away from the parking position P to the D1 position. This is indicated by the curve shown above the turbine speed curve n_t.

From the curve of the actuating pressure P_kupE of the shifting element E it can be seen that owing to its continuous pressurization the shifting element E is already closed. Furthermore, from the curve of the actuating pressure P_kupF of the shifting element F it is clear that the shifting element F is continuously pressurized and is therefore also already closed. Thus, from the curves of the actuating pressure P_kupE and the actuating pressure P_kupF it is evident that these two shifting elements E and F for engaging the fail-safe gear in the automatic transmission are already closed before time T1. This means that the emergency condition has already been activated during the parked situation, i.e. already before the driver's wish to engage a gear.

From the curve of the actuating pressure P_kupD of the shifting element D it is clear that at time T1 a rapid filling phase of the actuation hydraulics of the shifting element D is initiated because of the driver's wish.

With a hydraulic fault of this type, owing to the pressurized shifting elements E and F and the additional rapid filling of the further shifting element D the curve of the rotational speed measured on the transmission input side, i.e. for example the turbine speed n_t of the torque converter at the transmission input, is changed. In the context of the monitoring process according to the invention this change of the course of the turbine rotational speed n_t is detected and the fault condition is therefore recognized, so that this can correspondingly be reacted to without having to provide additional pressure sensors at the valve responsible for pressurizing the shifting elements that produce the fail-safe gear.

For that purpose the stored theoretical curve of the turbine speed n_t_normal is compared with the actual turbine speed curve n_t_Fault observed. From the two curves n_t_normal and n_t_Fault it can be seen that with a faulty actual turbine speed curve n_t_Fault, the turbine speed n_t is reduced too early, already at a time T2 after the rapid filling of the further shifting element D at the beginning of the gear engagement process has taken place. Compared with the normal condition the turbine speed is reduced much more quickly, i.e. with a higher gradient. In the normal situation the turbine speed n_t is not reduced until time T4, during the filling equalization phase at the shifting element D. Moreover, the turbine speed n_t is reduced below the fault threshold n_t_Swell substantially more slowly that in a fault situation, i.e. with a lower gradient.

In the method according to the invention the difference shown by the actual course of the turbine speed n_t_Fault is recognized and the closing of any further shifting elements is prevented by virtue of the preselected fail-safe gear.

After recognition of the fault condition and activation of the emergency function, the fail-safe gear in the automatic transmission is engaged until the fault situation has been eliminated. Thus, the vehicle can be moved safely to a repair shop where the fault can be put right. When the fault condition is recognized the transmission can, for example, issue a warning message to the driver so that he can adjust to the situation.

When no differences are recognized in the comparison between the actual and the theoretical curves, there is no gearset redundancy. In that situation, which corresponds to the normal condition, the process of engaging the desired gear continues. In this case it can be seen from the curve of the actuating pressure P_kupD that during its equalization filling phase the shifting element D is continually closed. The curve of the actuating pressure P_kupA shows that at time T4 the interlocking shifting element A is also closed in order to engage the desired gear D1.

INDEXES

P Parking position
D1-D9 Drive position or gear
n_t Turbine rotational speed
n_t_Fault Faulty actual curve of the turbine speed
n_t_normal Theoretical curve of the turbine speed in the normal condition
n_t_Swell Fault threshold
P_kupE Actuating pressure of the shifting element E
P_kupF Actuating pressure of the shifting element F
P_kupD Actuating pressure of the shifting element D
P_kupA Actuating pressure of the shifting element A
T1 Time point
T2 Time point
T3 Time point
T4 Time point
T5 Time point
A to F Shifting elements

The invention claimed is:

1. A method of monitoring an emergency condition in an automatic transmission, the method comprising the steps of:
comparing a theoretical and an actual rotational speed that is measured on a transmission input side, and
preventing an overlap of the activated emergency condition, with a gear engagement process called for during normal condition, depending on the comparison.

2. The method according to claim 1, further comprising the step of recognizing a fault condition, when there is a deviation between a stored theoretical curve and the actual curve of the rotational speed measured on the transmission input side, and
preventing activation of any further shifting element (A, D) if a fault condition is recognized.

3. The method according to claim 1, further comprising the step of defining the rotational speed on the transmission input side as the rotational speed of a turbine of a torque converter on the transmission input side.

4. The method according to claim 3, further comprising the step of recognizing a fault condition by a drop of the actual turbine rotational speed (n_t_Fault) in the automatic transmission before a predetermined point in time (T4).

5. The method according to claim 1, further comprising the step of switching off an electronic transmission control system when a fault condition is recognized.

6. The method according to claim 2, further comprising the step of, when a fault condition is recognized, permanently engaging a fail-safe gear in the automatic transmission until the fault condition is eliminated.

7. The method according to claim 1, further comprising the step of issuing a warning message to a driver when a fault condition is recognized.

8. A method of detecting an emergency condition in an automatic transmission of a vehicle, the method comprising the steps of:
monitoring actual turbine rotational speeds of a torque converter on an input side of the automatic transmission;
comparing the actual turbine rotational speed of the torque converter with stored theoretical turbine rotational speeds of the torque converter;
recognizing a fault condition when the actual turbine rotational speed of the torque converter deviates from the stored theoretical turbine rotational speeds of the torque converter; and
preventing an overlap of emergency operation of the automatic transmission and a gear engagement process, during normal operation of the automatic transmission, when the fault condition is recognized.

9. The method according to claim 8, further comprising the step of preventing activation of any shifting element when the fault condition is recognized.

10. The method according to claim 8, further comprising the step of switching off an electronic transmission control system when the fault condition is recognized.

11. The method according to claim 8, further comprising the step of, when the fault condition is recognized, permanently engaging a fail-safe gear, in the automatic transmission, until the fault condition is eliminated.

12. The method according to claim 8, further comprising the step of issuing a warning message to a driver of the vehicle when the fault condition is recognized.

* * * * *